United States Patent [19]

Robertson

[11] Patent Number: 5,631,937
[45] Date of Patent: May 20, 1997

[54] METHOD AND APPARATUS FOR PROTECTING A PWR FROM DEPARTURE FROM NUCLEATE BOILING AND HOT LEG BOILING

[75] Inventor: Paul W. Robertson, Murrysville, Pa.

[73] Assignee: Westinghouse Electric Corporation, Pittsburgh, Pa.

[21] Appl. No.: 559,304

[22] Filed: Nov. 15, 1995

[51] Int. Cl.⁶ .................................................. G21C 7/36
[52] U.S. Cl. ................................. 376/216; 376/247
[58] Field of Search .................................... 376/216, 217, 376/247; 364/527, 224.9, 924.4

[56] References Cited

U.S. PATENT DOCUMENTS

| | | | |
|---|---|---|---|
| 3,791,922 | 2/1974 | Musick | 376/217 |
| 4,318,778 | 3/1982 | Musick | 376/216 |
| 4,427,620 | 1/1984 | Cook | 376/216 |
| 4,783,307 | 11/1988 | Galligan et al. | 376/217 |
| 5,379,328 | 1/1995 | Perez et al. | 376/217 |

*Primary Examiner*—Daniel D. Wasil

[57] ABSTRACT

A pressurized water reactor (PWR) is protected from departure from nucleate boiling and from hot leg boiling by generating a segmented delta temperature trip function having a first line segment which closely follows the departure from nucleate boiling core limit line and a second segment closely following the hot leg boiling core limit line. Each line segment is a function of the average core temperature and coolant pressure with the departure from nucleate boiling segment further adjusted for axial power distribution. The two set points are continuously compared to actual delta temperature in four independent channels. If either set point is exceeded in at least two channels, the reactor is tripped.

10 Claims, 3 Drawing Sheets

METHOD AND APPARATUS FOR PROTECTING A PWR FROM DEPARTURE FROM NUCLEATE BOILING AND HOT LEG BOILING

BACKGROUND OF THE INVENTION

1. Field of the Invention

This invention relates to apparatus and method for protecting the core of a pressurized water reactor from departure from nucleate boiling and hot leg boiling. More particularly, it is directed to such an apparatus and method which trips the reactor if operating limits set by a segmented delta temperature set point boundary are exceeded.

2. Background Information

Fuel integrity is an important safety and economic concern in nuclear power plants. In recognition of this, it is known to employ an overpower delta temperature reactor trip function to protect against fuel melting and an over temperature delta temperature reactor trip function to protect against departure from nucleate boiling and hot leg boiling. If departure from nucleate boiling is precluded, adequate heat transfer is assured between the fuel rod cladding and the reactor coolant, and therefore potential damage due to inadequate cooling is prevented. The hot leg temperature must be less than the saturation temperature. The protection system uses the reactor vessel temperature difference (delta temperature) as a measure of core power. To assure that the delta temperature is proportional to core power, hot leg boiling must be precluded.

The limits imposed upon plant operation by these phenomenon can be presented on a plot of reactor vessel delta temperature ($\Delta T$) versus reactor coolant system average temperature (T avg) as shown in FIG. 1 where line 1 is the departure from nucleate boiling core limit line and line 3 is the hot leg boiling limit line. As can be seen, these core limits define line segments of different slope which intersect. An overtemperature $\Delta T$ set point 5 has been developed to prevent the core from reaching the core limit lines 1 and 3 by tripping the reactor before the measured vessel delta temperature reaches either line of the core limits. Graphically, the core operating point 7 must remain to the left of the core limit lines 1 and 3 in FIG. 1. Current set point methodology generates an overtemperature $\Delta T$ set point 5 which is a straight line, even though the core limits are made up of two line segments 1 and 3. The single line segment overtemperature $\Delta T$ set point 5 results in a significant loss of operating margin between this set point line and the full power operating point of the reactor. This margin is currently not available to the reactor operator. Over the past several years, accident analysis margins associated with the departure from nucleate boiling related events have continually eroded. Contributing factors to the situation are advanced fuel features, higher fuel peaking factors which are required to accommodate longer fuel cycles, plant upratings, and reactor coolant system flow reductions. Furthermore, although not usually as severe, hot leg boiling margins are impacted by reactor coolant system flow reductions, upratings, or similar plant changes. As these margins are eroded, the corresponding core thermal limit lines become more limiting. This in turn results in more limiting overtemperature $\Delta T$ set points.

More limiting overtemperature $\Delta T$ set points can impede plant operation by increasing the potential for plant trip. The ability of the plant to "ride out" an operational transient such as a partial loss of feed water or load rejection is reduced by restrictive overtemperature $\Delta T$ set points. Furthermore, restrictive set points may result in partial trip signals in the multichannel protection system should the process parameter signals feeding into the set point algorithm be somewhat noisy. This places the plant in a partial trip situation which could lead to an actual reactor trip should the plant experience a minor transient leading to any one remaining channel tripping.

A limiting factor to providing less restrictive overtemperature $\Delta T$ set points is the space available in the cabinets for the protection system which requires redundancy for reliability.

There is need, therefore, for an improved method and apparatus for protecting a pressurized water reactor from departure from nucleate boiling and hot leg boiling.

There is also a need for such an improved method and apparatus which improves the operating margin available to the operator.

There is a further need for such a method and apparatus which reduces the potential for unnecessary tripping of the reactor.

There is an associated need for such an improved method and apparatus which can be implemented in the available protection system cabinet space.

SUMMARY OF THE INVENTION

These needs and others are satisfied by the invention which is directed to a method and apparatus for protecting a pressurized water reactor from departure from nucleate boiling and hot leg boiling by providing separate $\Delta T$ set points relative to the departure from nucleate boiling core limit and the hot leg boiling core limit. These set points are defined by separate linear functions having slopes which, in a general way, follow the slope of the respective core limit. These two set point values are generated on an on-line basis from measured average temperature and pressure. In addition, the set point associated with the departure from nucleate boiling core limit is adjusted as a function of measured axial power distribution.

More particularly, the invention is directed to a method of protecting a pressurized water nuclear reactor from departure from nucleate boiling and hot leg boiling comprising the steps of: determining a temperature change in coolant flowing through a reactor vessel (delta temperature); determining an average temperature of the coolant flowing through the reactor vessel (average temperature); determining a first set point for delta temperature relative to a departure from nucleate boiling core limit; determining a second set point for delta temperature relative to a hot leg boiling core limit; and tripping said reactor when delta temperature reaches or exceeds either the first set point value or second set point value.

The invention is further directed more particularly to apparatus for protecting a pressurized water nuclear reactor from departure from nucleate boiling and hot leg boiling wherein the apparatus comprises: temperature sensing means measuring temperature of coolant entering and leaving a reactor vessel; means determining from the temperature sensing means a temperature change in the coolant flowing through the reactor vessel (delta temperature) and an average temperature; means determining from the temperature sensing means an average temperature of coolant flowing through the reactor vessel; means determining pressure of the coolant; means generating from the pressure and the average temperature a first set point value for delta temperature relative to a departure from nucleate boiling core limit; means determining from the pressure and average temperature a second set point value for delta temperature relative to a hot leg boiling core limit; and means tripping the reactor when delta temperature reaches or exceeds the first set point value or the second set point value.

In addition, the invention relates to a method and apparatus wherein the means generating the first set point and the means generating the second set point are implemented by application specific integrated circuit means.

BRIEF DESCRIPTION OF THE DRAWINGS

A full understanding of the invention can be gained from the following description of the preferred embodiments when read in conjunction with the accompanying drawings in which.

DESCRIPTION OF THE PREFERRED EMBODIMENTS

Figure 1:
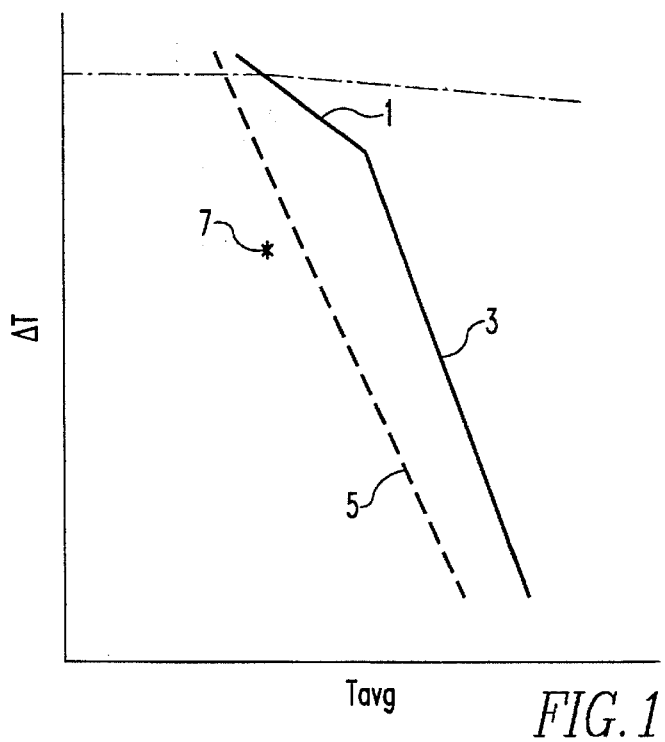
FIG. 1 is a plot of delta temperature ($\Delta T$) versus average temperature ($T_{avg}$) illustrating the prior art methodology of providing protection against departure from nucleate boiling and hot leg boiling.

FIG. 1 illustrates schematically a pressurized water reactor (PWR) nuclear steam supply system 1 which includes a reactor vessel 3 housing a reactor core 5 containing fissionable fuel. Reactor coolant in the form of light water is circulated upwardly through the reactor core 5 where it is heated by the fission reactions. The heated coolant is transferred through a hot leg 7 to a steam generator 9 which utilizes the heat in the reactor coolant to generate steam in a secondary loop (not shown) which contains a turbine generator for generating electric power. The vitiated reactor coolant is returned to the reactor vessel 3 through a cold leg 11 by a reactor coolant pump 13. The cold leg 11 discharges the coolant into a downcomer 15 for recirculation up through the core 5. While FIG. 1 illustrates a single primary loop 17 including a single hot leg 7, steam generator 9, cold leg 11 and reactor coolant pump 13, in reality a PWR will have at least 2 such primary loops and in many instances three or four, all supplied with heated reactor coolant from a single reactor vessel 3. A pressurizer 19 serves as an accumulator to maintain operating pressure in the primary loop 17.

A control system 21, of which only pertinent parts are shown, includes control rods 23 which can be inserted into reactor core 5 by a control rod drive mechanism 25 for shutting the reactor down, and in some instances, for controlling power level.

A large number of parameters are monitored for use by the control rod drive mechanism 25 and other control components not shown. In controlling the operation of the PWR 1, instrumentation for measuring the various parameters includes resistance temperature detectors (RTDs) 27 which measure the temperature of the coolant leaving the reactor in the hot leg 7. Additional RTDs 29 measure the temperature of the coolant entering the reactor through the cold leg 11. A transducer 31 in the pressurizer 31 measures the reactor coolant pressure. Excore detectors 33 extend vertically along the reactor vessel 3 adjacent to core 5 to measure neutron flux. The excore detectors 33 are divided into an upper section $33_t$ and a lower section $33_b$ which provide signals used to measure the axial power distribution in the core 5.

These measured parameters are used not only by the control system, but also by a protection system 35, which, independently of the control system, monitors operation of the reactor and shuts it down should an unsafe condition be approached. For reliability, the protection system includes multiple channels, typically 4, each having their own sensors and processors which redundantly monitor specified conditions. Thus four of the RTDs 27 and 29, the pressure transducer 31, and the excore detectors 33 are provided. In a four-loop system, one set of RTDs is provided in each loop, while in the two-loop system, pairs of instrumentation are provided in each loop. In all cases, the four excore detectors 33 are spaced in quadrature around the vessel 3.

Figure 3:
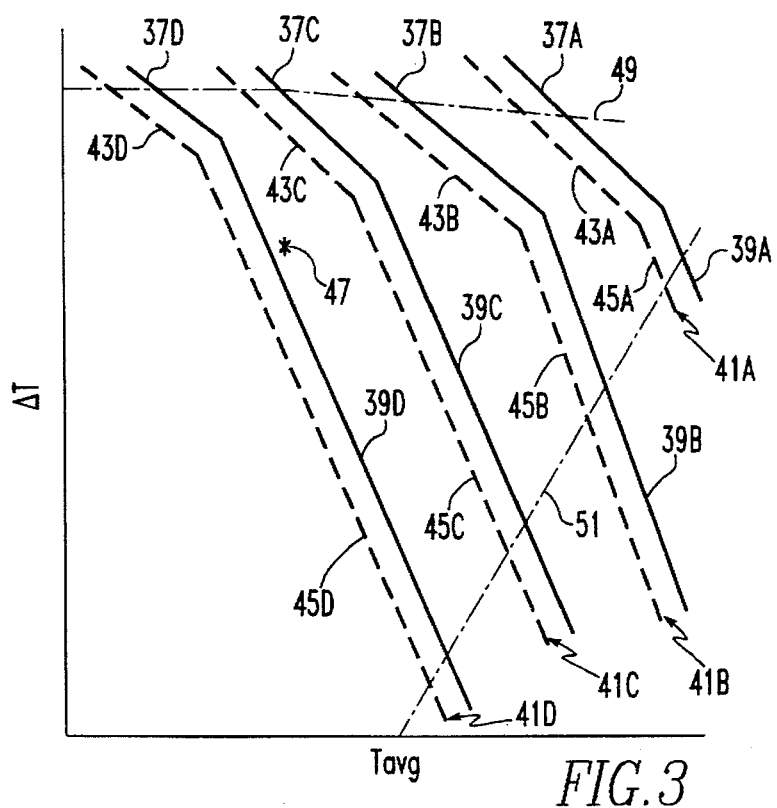
FIG. 3 is a plot of $\Delta T$ versus $T_{avg}$ illustrating operation of the PWR of FIG. 2 in accordance with the invention.
Figure 2:
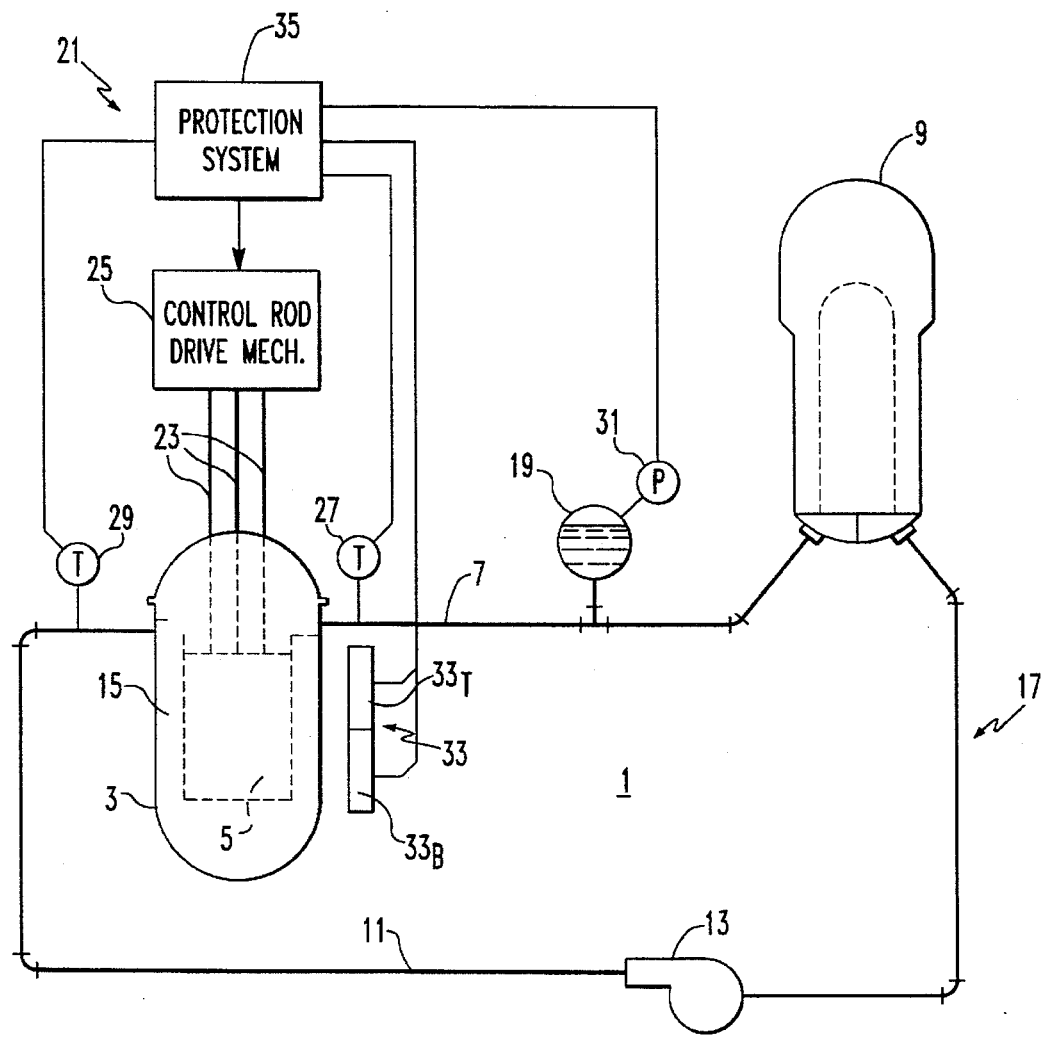
FIG. 2 is a simplified schematic diagram of a pressurized water reactor system incorporating the invention.

As previously discussed, the present invention is directed toward providing protection for the reactor core 5 from departure from nucleate boiling and from hot leg boiling. FIG. 3 illustrates the methodology used. As in the case of FIG. 1, FIG. 3 is a plot of $\Delta T$ versus $T_{avg}$. $\Delta T$ is the rise in temperature of the coolant as it passes through the core and is equal to the difference between the exit temperature measured by the hot leg RTD 27 and the entrance temperature measured by the cold leg RTD 29. $T_{avg}$ is the average of these two temperatures. FIG. 3 illustrates the departure from nucleant boiling core limit lines 37 and the hot leg boiling core limit lines 39 for several pressures indicated by the subscripts A–D.

Unlike the current protection system which provides a single line segment trip function, the present invention provides a segmented trip function 41 shown for each of the pressure conditions A–D which includes a first straight line segment 43 which is the set point for the departure from nucleant boiling core limit and a second straight line segment 45 for the hot leg boiling core limit. As can be seen from FIG. 3, these two segment set point functions 41 more closely track the two core limits 43 and 45 and thereby provide a much greater margin to trip for a typical full power operating point 47 of the reactor. For instance, for operation at a pressure which produces the core limit lines 37c and 39c, the trip set point function 41c of the invention provides much greater margin for the operating point 47 than does the corresponding prior art set point function (See FIG. 1). As discussed above, this allows greater flexibility in the operation of the reactors such as the use of advanced fuel features and higher fuel peaking factors which accommodate longer fuel cycles, plant upratings, reactor coolant system flow reductions and similar plant changes. It also increases the ability of the plant to "ride out" an operational transient such as a partial loss of feed water or a load rejection and reduces the likelihood of partial trips due to noisy parameter signals.

The line 49 in FIG. 3 is an overpower $\Delta T$ limit line. This is another protection criteria for the core which prevents fuel melting. This is a separate protection function which will shut the reactor down should $\Delta T$ exceed the indicated limits. The line 51 is the locus of conditions where the steam generator safety valves open. The opening of these valves effectively limits hot leg temperatures.

The delta T departure from nuclear boiling (DNB) trip set point is calculated using the following equation:

$$\Delta T^{DNB}_{SETPOINT} = K_1 - K_2 \left( \frac{1+\tau_1 s}{1+\tau_2 s} \right) (T_{AVG} - T^{NOM}_{AVG}) + \quad \text{Eq. (1)}$$

$$K_3 (P - P^{NOM}) - f(\Delta I)$$

Where:

$K_1$=A preset, manually adjustable bias (fraction of full power $\Delta T$)

$K_2$=A constant based on the effect of temperature on the design limits (fraction of full power $\Delta T/°F$.)

$K_3$=A constant based on the effect of pressure on the design limits (fraction of full power $\Delta T/psi$)

$T_{AVG}$=Average reactor coolant temperature (°F.)

$T_{AVG}^{NOM}$ = Nominal average reactor coolant temperature at full power (°F.)

P = Pressurizer pressure (psia)

$P^{NOM}$ = Nominal pressurizer pressure (psia)

$\tau_1, \tau_2$ = Time constants (sec)

s = Laplace transform operator (sec$^{-1}$)

f(ΔI) = A function of the neutron flux difference as measured between the upper and lower ion chambers (fraction of full power ΔT)

The f(ΔI) function is a compensating term which is factored into the setpoint to account for the effect of core axial power distribution on DNB.

It should be noted that Equation (1) is identical to the current single line segment algorithm. However, the K values for this equation are substantially less restrictive than those currently used.

The $\Delta T^{HLB}$ trip setpoint protects the hot leg boiling core thermal limit lines. The $\Delta T^{HLB}$ trip setpoint is calculated using the following equation:

$$\Delta T_{SETPOINT}^{HLB} = K'_1 - K'_2 \left( \frac{1 + \tau_1 s}{1 + \tau_2 s} \right) (T_{AVG} - T_{AVG}^{NOM}) + K'_3 (P - P^{NOM}) \quad \text{Eq. (2)}$$

These K values (denoted with a prime) differ from those in the $\Delta T^{DNB}$ setpoint. Furthermore, there is no f(ΔI) penalty function applied to this equation since the axial power distribution does not affect hot leg boiling margin.

Finally, the protection system compares the two setpoints and ensures that the measured ΔT is less than the minimum of these two setpoint values:

$$\Delta T \leq \min[\Delta T_{SETPOINT}^{DNB}, \Delta T_{SETPOINT}^{HLB}] \quad \text{Eq. (3)}$$

The protection system can be implemented in the currently used analog hardware, but is preferably implemented by application specific integrated circuits (ASICs) or in software. Most preferably it is implemented by multifunctional ASICs which can be configured to perform various functions such as the ASICSs covered by U.S. patent application Ser. No. 08/408,428 filed on Mar. 22, 1995 which is hereby incorporated by reference.

Figure 4:
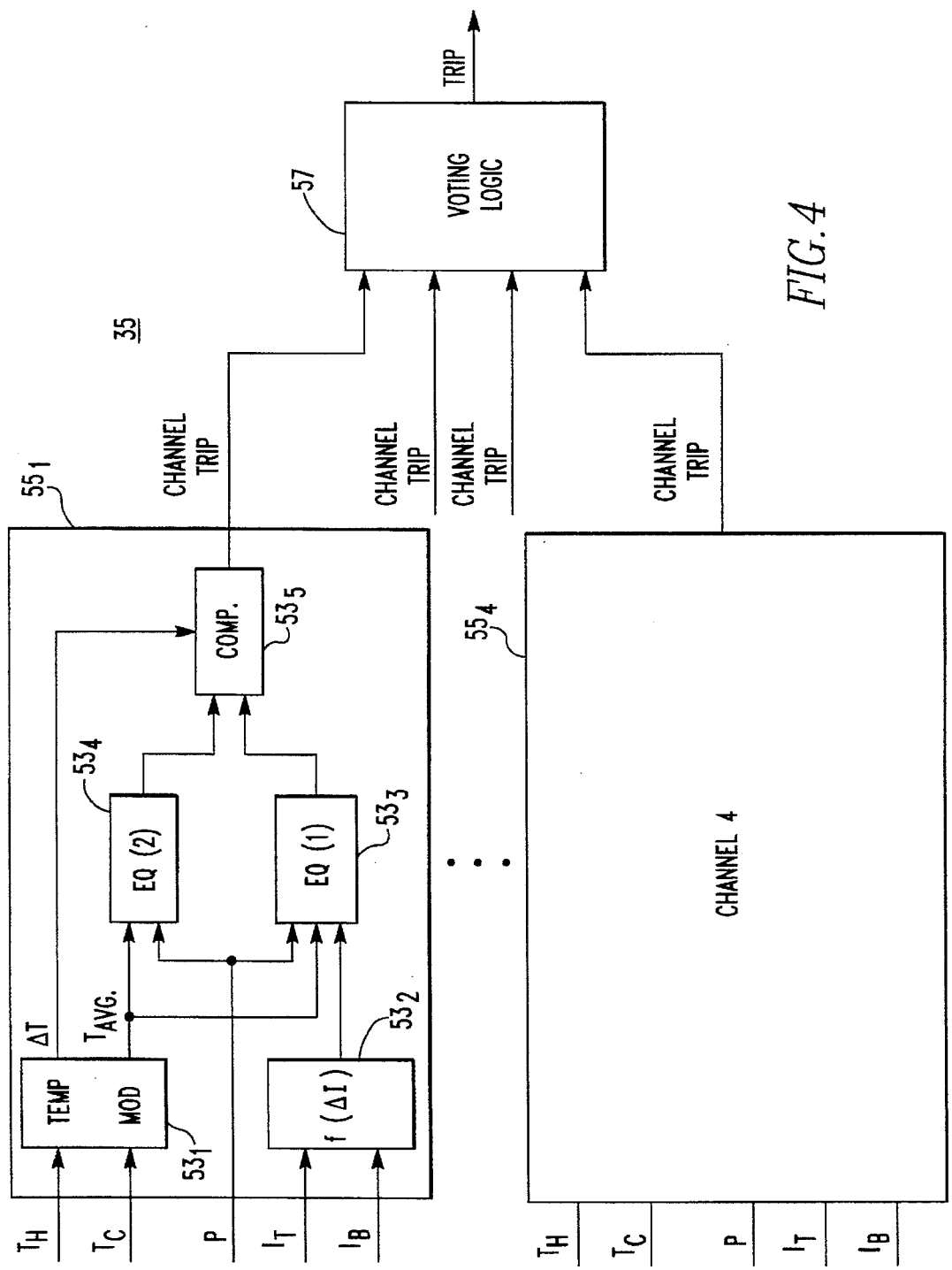
FIG. 4 is a schematic diagram in block form of part of the protection system of the PWR of FIG. 2 incorporating the invention.

FIG. 4 illustrates the protection system 35 which is implemented by a number of such multifunction ASICs 53. As mentioned, the protection system 35 has four channels $55_1$–$55_4$. Each channel, such as channel 1, $55_1$ receives as inputs: the hot leg temperature $T_h$ from the RTD 27, the cold leg temperature $T_c$ from the RTD 29, the coolant pressure P from the transducer 31, and the neutron flux signals for the upper half of the core $I_t$ and the lower half of the core $I_b$ from the excore detectors 33. A temperature module $53_1$ generates the ΔT and $T_{avg}$ signals from the inputs $T_h$ and $T_c$. Another module $53_2$ generates the signal which is a function of the axial power distribution derived from signals provided by the upper and lower sections of the excore detector 33. The module $53_3$ implements Equation (1) above to generate the departure from nucleate boiling set point signal, while the hot leg boiling point setpoint signal is generated by the module $53_4$ using equation (2). ΔT is then compared with the two set point values in the module $53_5$. If either of the set point values is reached or exceeded, a channel trip signal is generated. The channel trip signals are all applied to voting logic 57 which, as is well known, generates a trip signal in response to a predetermined number of channel trip signals, typically two out of four or two out of three (such as when one channel is out of service). The trip signal is provided to the control rod drive mechanism 25 which drops the control rods 23 into the reactor core 5 to shut the reactor down.

As can be appreciated from the above, splitting the ΔT protection function into two line segments makes it possible for each segment to closely parallel the corresponding core limit line. This increases the plant margin to trip. It also makes the trip function easier to understand since separate departure from nucleate boiling protection and hot leg boiling protection, each protecting against actual physical limits rather than one composite trip function, are provided. The improved operability margins gained through the two-line segment setpoint approach could be used to increase peaking factors which in turn could provide more flexible loading patterns and improved fuel cycle economy. Also, the increased margin to trip during operational transients and set point maintenance will ensure that unnecessary reactor trips will not occur. For plants which are experiencing sporadic partial trips due to oscillations in the hot leg temperature indication, the segmented overtemperature delta temperature set point function provided by the invention is expected to generate much more than sufficient margin to eliminate those unnecessary trip signals.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of invention which is to be given the full breadth of the claims appended and any and all equivalents thereof.

What is claimed is:

1. A method of protecting a pressurized water nuclear reactor from departure from nucleate boiling and hot leg boiling comprising the steps of determining a temperature change in coolant flowing through a reactor vessel (delta temperature);

determining an average temperature of the coolant flowing through the reactor vessel (average temperature);

determining a first set point for delta temperature relative to a departure from nucleate boiling core limit;

determining a second set point for delta temperature relative to a hot leg boiling core limit; and tripping said reactor when delta temperature reaches or exceeds either said first set point value or said second set point value.

2. The method of claim 1 including determining pressure of said coolant, and wherein said step of determining said first set point value comprises determining said first set point value as a first function of average temperature and said pressure, and wherein determining said second set point value comprises determining said value of said second set point as a second function of said average temperature and said pressure which is different from said first function.

3. The method of claim 1 wherein said step of determining said first set point value comprises utilizing a generally linear first function of said average temperature and pressure having a first slope, and wherein determining said second set point value comprises determining the value of the second set point as a generally linear second function of average temperature and pressure having a second slope which is different from said first slope.

4. The method of claim 2 comprising determining an axial power distribution in said reactor, and adjusting first set point value as a function of said axial power distribution.

5. The method of claim 4 wherein said step of determining said first set point value comprises utilizing a generally linear first function of said average temperature and pressure having a first slope, and wherein determining said second set point value comprises determining the value of the second set point as a generally linear second function of average temperature and pressure having a second slope which is different from said first slope.

6. The method of claim 5 wherein said steps of determining said first set point value and said second set point value comprise providing a plurality of channels each determining a first channel set point value and a second channel set point value for delta temperature, and generating a channel trip signal when delta temperature exceeds the first channel set point value or said second channel set point value, and wherein said reactor is tripped only if a predetermined number of channels generate a channel trip signal.

7. Apparatus for protecting a pressurized water nuclear reactor from departure from nucleate boiling and hot leg boiling, said apparatus comprising:

temperature sensing means measuring temperature of coolant entering and leaving a reactor vessel;

means determining from said temperature sensing means a temperature change in the coolant flowing through said reactor vessel (delta temperature) and an average temperature;

means determining pressure of said coolant;

means generating from said pressure and said average temperature a first set point value for said delta temperature relative to a departure from nucleate boiling core limit;

means generating from said pressure and average temperature a second set point value for said delta temperature relative to a hot leg boiling core limit; and means tripping said reactor when said delta temperature reaches or exceeds said first said set point value or said second set point value.

8. The apparatus of claim 7 including means determining axial power distribution in said reactor, and wherein said means generating said first set point value adjusts said first set point value as a function of said axial power distribution.

9. The apparatus of claim 8 wherein said means generating said first set point value generates said first set point value as a first generally linear function of average temperature and pressure having a first slope, and wherein said means generating second said set point value generates said second set point value as a function of a second generally linear function of average temperature and pressure having a second slope different from said first slope.

10. The apparatus of claim 9 wherein said means generating said first set point value and said means generating said second set point value are implemented by application specific integrated circuit means.

* * * * *